(12) United States Patent
Nakashima et al.

(10) Patent No.: US 9,014,575 B2
(45) Date of Patent: Apr. 21, 2015

(54) SAMPLING CLOCK SYNCHRONIZING APPARATUS, DIGITAL COHERENT RECEIVING APPARATUS, AND SAMPLING CLOCK SYNCHRONIZING METHOD

(75) Inventors: Hisao Nakashima, Kawasaki (JP);
Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 13/345,008

(22) Filed: Jan. 6, 2012

(65) Prior Publication Data

US 2012/0195602 A1 Aug. 2, 2012

(30) Foreign Application Priority Data

Jan. 31, 2011 (JP) ................... 2011-018847

(51) Int. Cl.
*H04B 10/06* (2006.01)
*H04L 7/027* (2006.01)
*H04L 7/033* (2006.01)

(52) U.S. Cl.
CPC .............. *H04L 7/027* (2013.01); *H04L 7/0337* (2013.01)

(58) Field of Classification Search
USPC .................................................. 398/202–214
See application file for complete search history.

(56) References Cited

U.S. PATENT DOCUMENTS

| | | | |
|---|---|---|---|
| 8,406,635 B2 * | 3/2013 | Nakashima et al. | 398/158 |
| 8,478,137 B2 * | 7/2013 | Komaki et al. | 398/208 |
| 8,649,689 B2 * | 2/2014 | Koizumi et al. | 398/204 |
| 2009/0208224 A1 | 8/2009 | Kikuchi | |
| 2010/0150550 A1 | 6/2010 | Hashimoto | |
| 2010/0329698 A1 | 12/2010 | Nakashima | |
| 2012/0099864 A1 | 4/2012 | Ishihara et al. | |

FOREIGN PATENT DOCUMENTS

| | | |
|---|---|---|
| JP | 7-235896 A | 9/1995 |
| JP | 2002-208893 A | 7/2002 |
| JP | 2010-147532 A | 7/2010 |
| JP | 2011-009956 | 1/2011 |
| JP | 2011-015013 | 1/2011 |
| WO | WO-2005/083502 | 9/2005 |
| WO | 2007/132503 A1 | 11/2007 |
| WO | 2011/007803 A1 | 1/2011 |

OTHER PUBLICATIONS

Gardner, Floyd M. et al., "A BPSK/QPSK Timing-Error Detector for Sampled Receivers", IEEE Transactions on Communications, vol. COM-34, No. 5, May 1986, pp. 423-429.
JPOA—Office Action issued for Japanese Patent Application No. 2011-018847 mailed Jun. 24, 2014. Translation of relevant part: p. 1 line 17 to p. 3 line 1.

* cited by examiner

*Primary Examiner* — M. R. Sedighian
(74) *Attorney, Agent, or Firm* — Fujitsu Patent Center

(57) ABSTRACT

In a sampling clock synchronizing apparatus, an A/D converter converts an analog signal to a digital signal based on a sampling clock, and a processor compensates a band limitation due to spectral narrowing by filter characteristics of characteristics opposite to those of the spectral narrowing with respect to a signal produced from the A/D converter subjected to the spectral narrowing, and detects a phase shift in the sampling clock based on a signal after the compensation of the spectral narrowing and synchronizes sampling timing.

5 Claims, 19 Drawing Sheets

FIG. 4
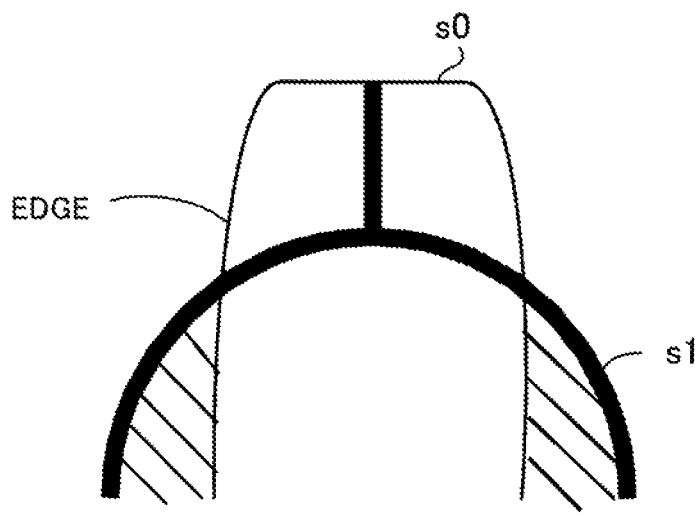
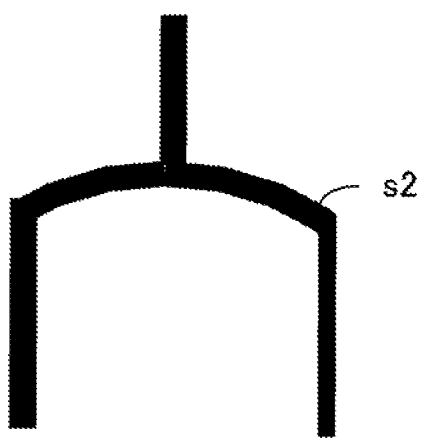

FIG. 5
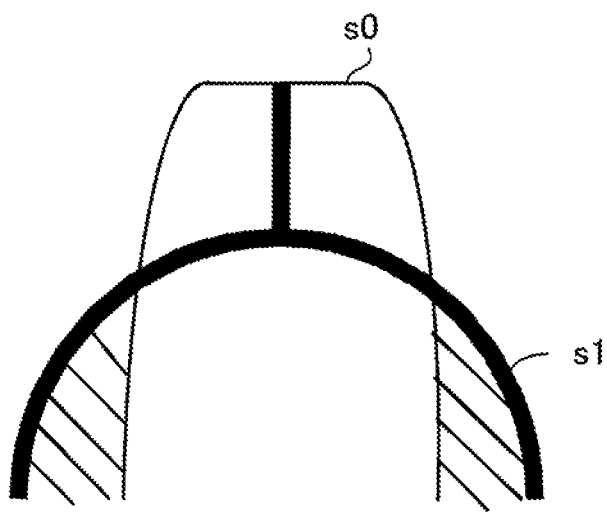
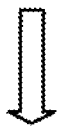
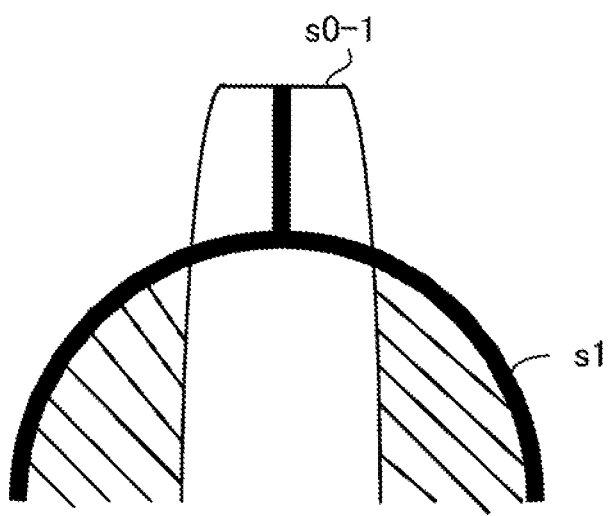

BEFORE SPECTRAL NARROWING

AFTER SPECTRAL NARROWING

SAMPLING CLOCK SYNCHRONIZING APPARATUS, DIGITAL COHERENT RECEIVING APPARATUS, AND SAMPLING CLOCK SYNCHRONIZING METHOD

CROSS-REFERENCE TO RELATED APPLICATION

This application is based upon and claims the benefit of priority of the prior Japanese Patent Application No. 2011-018847, filed on Jan. 31, 2011, the entire contents of which are incorporated herein by reference.

FIELD

The embodiment discussed herein is related to a sampling clock synchronizing apparatus which synchronizes a sampling clock, a digital coherent receiving apparatus which performs digital coherent reception, and a sampling clock synchronizing method for synchronizing a sampling clock.

BACKGROUND

Along with an increase in the Internet traffic, a further large capacity of a main network is expected and a digital coherent receiver technology attracts attention as a technology for realizing large-capacity and long distance transmission.

The coherent reception relates to a receiver technology in which a received optical signal and local oscillation light of a receiver are mixed and electric field information (phase and intensity of light) of a reception optical signal is converted into an electrical signal and then it is demodulated. When the coherent reception is performed, noise tolerance is largely improved.

Further, in digital coherent reception, an electrical signal of extracted electric field information is quantized by an A/D converter to be converted into a digital signal, and it is demodulated by a digital signal process.

In general, in a waveform distortion such as wavelength dispersion and polarization mode dispersion generated in optical fiber communication, a distortion compensation is performed by using optical components such as a dispersion compensating module. As compared with the above, in the digital coherent reception, a wavelength distortion is compensated by using the digital signal process.

Accordingly, the digital coherent reception has a merit that when it is used, an optical component for a waveform distortion compensation is unnecessary, and therefore optical loss of the optical component is eliminated and cost is also reduced.

Further, the waveform distortion compensation by using the digital signal process is theoretically compensated in excess of critical use of a compensation capability in a normal optical component, and therefore waveform distortion tolerance is largely improved.

As a technology, a technology of suppressing a sampling phase shift by using an equalizer which compensates a waveform distortion is proposed. In addition, a technology of suppressing transmission degradation of an optical signal subjected to a band limitation on a transmission line is proposed.

Japanese Laid-open Patent Publication No. 07-235896
Japanese Laid-open Patent Publication No. 2010-147532

In an optical transmission system for developing a main network, wavelength division multiplexing (WDM) for multiplexing multiple different wavelengths and performing transmission is used.

An optical repeater installed on an optical fiber transmission line has not only an optical amplifier which performs optical-repeater amplification but also an optical filter. When a processing such as wavelength demultiplexing and wavelength multiplexing is performed by using the optical filter, an arbitrary wavelength channel according to communication requests is able to be inserted or branched in each optical repeater.

On the other hand, an optical signal filtered by the optical filter is subjected to narrowing of a signal spectrum. Therefore, in an optical network on which a number of optical repeaters are installed, since an optical signal transmitting through an optical fiber passes through optical filters over multiple stages, the narrowing of a signal spectrum appears prominently.

The above-described spectral narrowing brings about degradation in signal quality, and in addition, reduces a modulation frequency component of an optical signal. Therefore, there is reduced a sensitivity of a sampling clock shift detection circuit necessary for synchronizing a sampling clock frequency to an A/D converter with a modulation frequency of an optical signal. Further, reception quality is degraded due to reduction in jitter and wander tolerance of the optical signal.

SUMMARY

According to one aspect of the present invention, a sampling clock synchronizing apparatus includes an A/D converter which converts an analog signal into a digital signal based on a sampling clock, and a processor which compensates a band limitation due to spectral narrowing by filter characteristics of characteristics opposite to those of the spectral narrowing with respect to a signal produced from the A/D converter subjected to the spectral narrowing, and detects a phase shift in the sampling clock based on a signal after the compensation of the spectral narrowing and synchronizes sampling timing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a spectrum of an optical signal after narrowing;

FIG. 5 illustrates spectral narrowing at the time of passing through optical filters connected in multiple stages;

DESCRIPTION OF EMBODIMENTS

Figure 1:
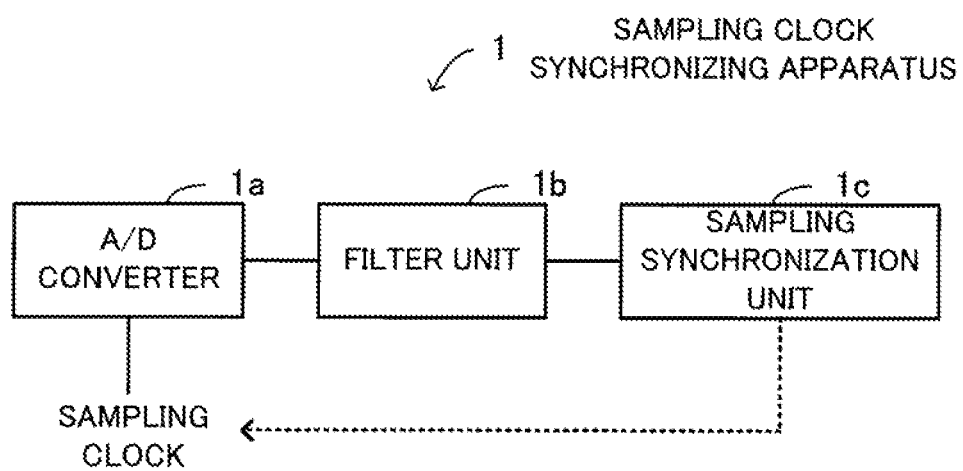
FIG. 1 illustrates a configuration example of a sampling clock synchronizing apparatus.

Preferred embodiments of the present invention will now be described in detail below with reference to the accompanying drawings, wherein like reference numerals refer to like elements throughout. FIG. 1 illustrates a configuration example of a sampling clock synchronizing apparatus. The illustrated sampling clock synchronizing apparatus 1 includes an A/D converter 1a, a filter unit 1b, and a sampling synchronization unit 1c.

The A/D converter 1a performs an analog/digital conversion based on a sampling clock. The filter unit 1b compensates a band limitation due to spectral narrowing by using filter characteristics of characteristics opposite to those of the spectral narrowing with respect to a signal produced from the A/D converter 1a subjected to the spectral narrowing.

The sampling synchronization unit 1c detects a phase shift in a sampling clock based on a signal after the compensation of the spectral narrowing. Further, the unit 1c adjusts a phase of the sampling clock and synchronizes sampling timing (specifically, the unit 1c synchronizes a frequency of the sampling clock with a frequency of the signal after the compensation of the spectral narrowing).

Figure 2:
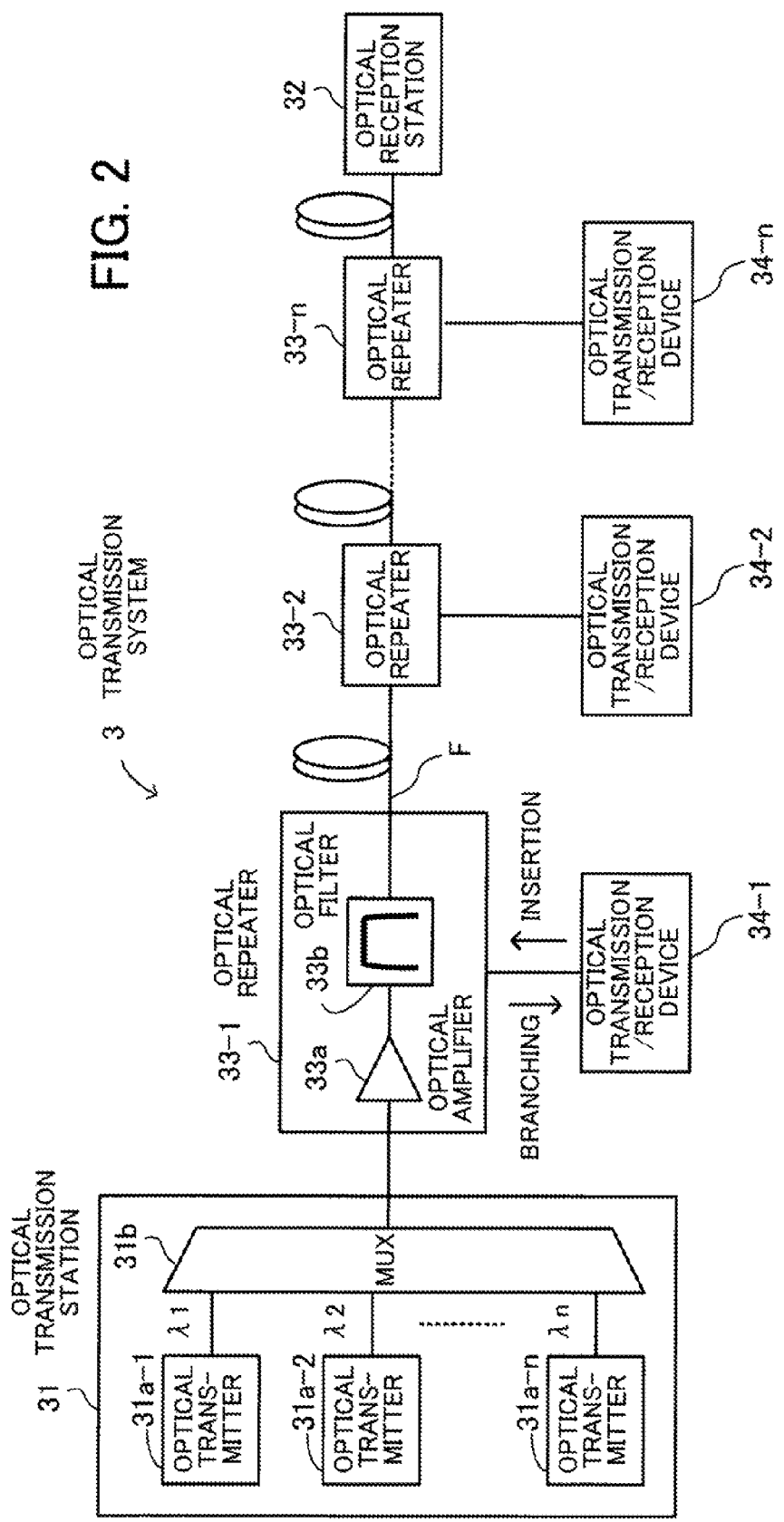
FIG. 2 illustrates a configuration example of an optical transmission system.

Next, an optical transmission system to which the sampling clock synchronizing apparatus 1 is applied will be described. FIG. 2 illustrates a configuration example of the optical transmission system. The optical transmission system 3 includes an optical transmission station 31, an optical reception station 32, optical repeaters (optical repeating stations) 33-1 to 33-n, and optical transmission/reception devices 34-1 to 34-n, and it is a system which performs WDM transmission.

The optical transmission station 31, the optical reception station 32, the optical repeaters 33-1 to 33-n, and the optical transmission/reception devices 34-1 to 34-n are connected via an optical fiber transmission line F. The optical transmission station 31 includes optical transmitters 31a-1 to 31a-n and a wavelength multiplexer 31b. Each of the optical repeaters 33-1 to 33-n has an optical amplifier 33a and an optical filter 33b.

In the optical transmission station 31, the optical transmitters 31a-1 to 31a-n transmit optical signals having wavelengths λ1 to λn different from each other. The wavelength multiplexer 31b multiplexes optical signals having wavelengths λ1 to λn, generates a WDM signal as wavelength multiplexed light, and transmits it through the optical fiber transmission line F.

In the optical repeaters 33-1 to 33-n, each optical amplifier 33a amplifies the received WDM signal. Each optical filter 33b performs filter processing of wavelength demultiplexing/multiplexing. Specifically, the optical filter 33b performs filter processing of the wavelength demultiplexing with respect to the WDM signal after the amplification, and branches an optical signal of a predetermined wavelength channel to the optical transmission/reception devices 34-1 to 34-n on the tributary side according to a communication request.

Or, according to the communication request, the optical filter 33b performs filter processing for multiplexing an optical signal of the predetermined wavelength channel inserted from the optical transmission/reception devices 34-1 to 34-n with the optically repeated WDM signal.

The sampling clock synchronizing device 1 illustrated in FIG. 1 is installed, for example, in each optical receiver of the optical reception station 32 and the optical transmission/reception devices 34-1 to 34-n. Further, the above-described optical transmission system 3 is established by linearly topology as one example, and further even by arbitrary network topology such as ring and mesh.

Figure 3:
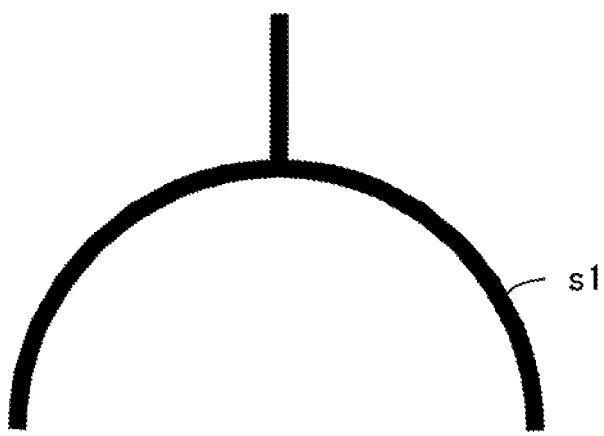
FIG. 3 illustrates a spectrum of an optical signal before narrowing.

Next, narrowing of a signal spectrum will be described. FIG. 3 illustrates a spectrum of an optical signal before the narrowing. The spectrum s1 illustrates, for example, a shape of a spectrum before the spectral narrowing of an optical signal produced from the optical transmitters 31a-1 to 31a-n of the optical transmission system 3.

FIG. 4 illustrates a spectrum of an optical signal after the narrowing. A spectrum s2 illustrates a shape of a spectrum after an optical signal of the spectrum s1 is repeated by the optical repeater and filtered by the optical filter 33b of the optical repeater.

When the spectrum s1 of an optical signal passes through the optical filter 33b, its shaded band is cut off by a band s0 of the optical filter 33b itself and the spectrum s1 narrows.

FIG. 5 illustrates the spectral narrowing at the time of passing through the optical filters 33b connected in multiple stages. A shape of the band s0 of the actual optical filter 33b itself is not a complete rectangular shape, and each edge has a curve profile. The shape of the band s0 may be varied in each optical filter 33b installed in the optical repeaters 33-1 to 33-n.

Therefore, a virtual optical filter passband width in the case where the optical filters are connected in multiple stages tends to be more narrowed gradually as the number of multi-stage connections of the optical filters is larger as in a band s0-1.

Accordingly, as an optical signal passes through more optical filters 33b, a spectrum band thereof is more cut off, and it becomes narrower.

Next, there will be described a reason where by the spectral narrowing, a detection sensitivity in a circuit for detecting a phase shift between an optical signal modulation frequency and a sampling clock to the A/D converter is reduced, jitter and wander tolerance of digital coherent reception is lowered due to the reduction in the detection sensitivity, and reception quality is degraded. As described above, in the digital coherent reception, a reception optical signal and local oscillation light (hereinafter, referred to as local light) are mixed, electric field information on the reception optical signal is extracted, an electrical signal of the extracted electric field information is quntized by the A/D converter to thereby convert it into a digital signal.

Here, to the A/D converter, a sampling clock source supplies a sampling clock, and timing for quantizing electrical signals by the A/D converter is determined by a sampling clock frequency.

At this time, it is of importance that a sampling clock frequency is matched with a modulation frequency (frequency at the time of modulating data of several tens of G bps into a carrier of optical signals) of the reception optical signal.

For this purpose, a phase shift between the modulation frequency of the reception optical signal and the sampling clock frequency needs to be detected and sampling timing needs to be synchronized based on the detected phase shift amount. Examples of the method for synchronizing the sampling timing include a method for adjusting a sampling clock frequency to an A/D converter based on the detection result of phase shift, and a method for adjusting a signal phase by using digital signal process; however, it is not limited to their configurations in the present invention.

When a digital coherent detection process is performed with respect to a signal in which the sampling timing is synchronized to demodulate received data, jitter or wander generated on the transmission side or on a transmission line is able to be followed and stabilized reception performance is able to be realized.

As described above, in the digital coherent reception, a phase shift between the modulation frequency of reception optical signals and the sampling clock frequency is detected. However, when the spectral narrowing as illustrated in FIGS. 4 and 5 is performed, detection sensitivity in a sampling phase shift is reduced and a correct phase shift amount fails to be detected.

Figure 6A:
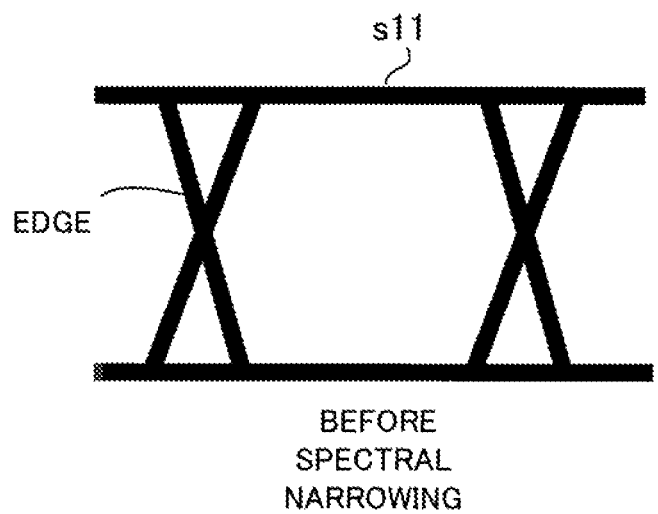
FIGS. 6A and 6B illustrate a transmission waveform and reception waveform of an intensity-modulated optical signal.
Figure 6B:
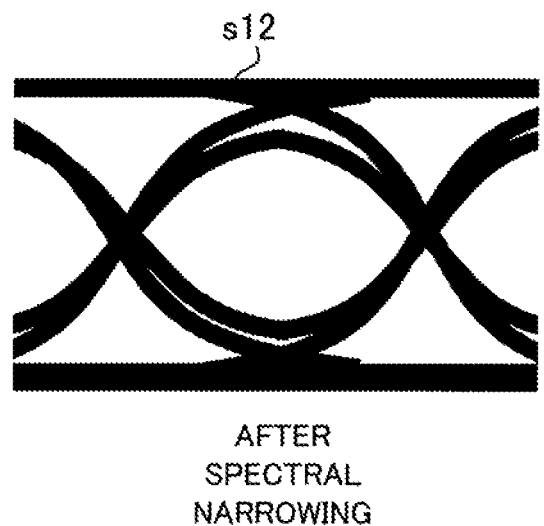

Reduction in the sensitivity will be described with reference to FIGS. 6A and 6B. FIGS. 6A and 6B illustrate a transmission waveform and reception waveform of the intensity-modulated optical signal. The transmission waveform s11 illustrates an eye pattern in the state before the spectral narrowing, and the reception waveform s12 illustrates an eye pattern in the state where the spectral narrowing occurs.

In the transmission waveform s11, since the spectral narrowing is not performed, rising edge and falling edge of the eye pattern are steep and also an aperture of the eye pattern is large. As compared with the above, when the spectral narrowing is performed as in the reception waveform s12, a high frequency component of modulated signals is cut off. Therefore, the rising edge and falling edge of the eye pattern are lost and an aperture of the eye pattern becomes small.

Examples of the phase shift detection method for synchronizing the sampling timing include a method for detecting a signal phase by detecting an edge. Therefore, when sharpness of the edge is reduced and lost by the spectral narrowing, the detection sensitivity in a sampling phase shift is reduced, and jitter and wander are not followed with accuracy. Further, variation in the detection sensitivity due to a change in a reception spectrum relying on the number of the optical filters through which an optical signal passes is also generated. In FIGS. 6A and 6B, for ease of explanation, an example of the intensity modulation system is described. Much the same is true on the case where a phase modulation and a multilevel modulation such as BPSK, QPSK, and 16QAM, and orthogonal frequency division multiplexing (OFDM) are used. As described above, when the digital coherent reception is performed with respect to the signal with the spectral narrowing, jitter and wander tolerance is lowered and the reception quality is degraded.

In view of the above-described points, it is an object of the present technology to provide a sampling clock synchronizing apparatus and digital coherent receiving apparatus which, even when receiving a signal with the spectral narrowing, increases jitter and wander tolerance, detects a phase shift of a sampling clock with high accuracy, and improves a reception performance.

Next, the optical reception apparatus to which the sampling clock synchronizing apparatus 1 is applied includes the digital coherent receiving apparatus. A configuration and operations of the digital coherent receiving apparatus will be described in detail subsequently.

Figure 7:
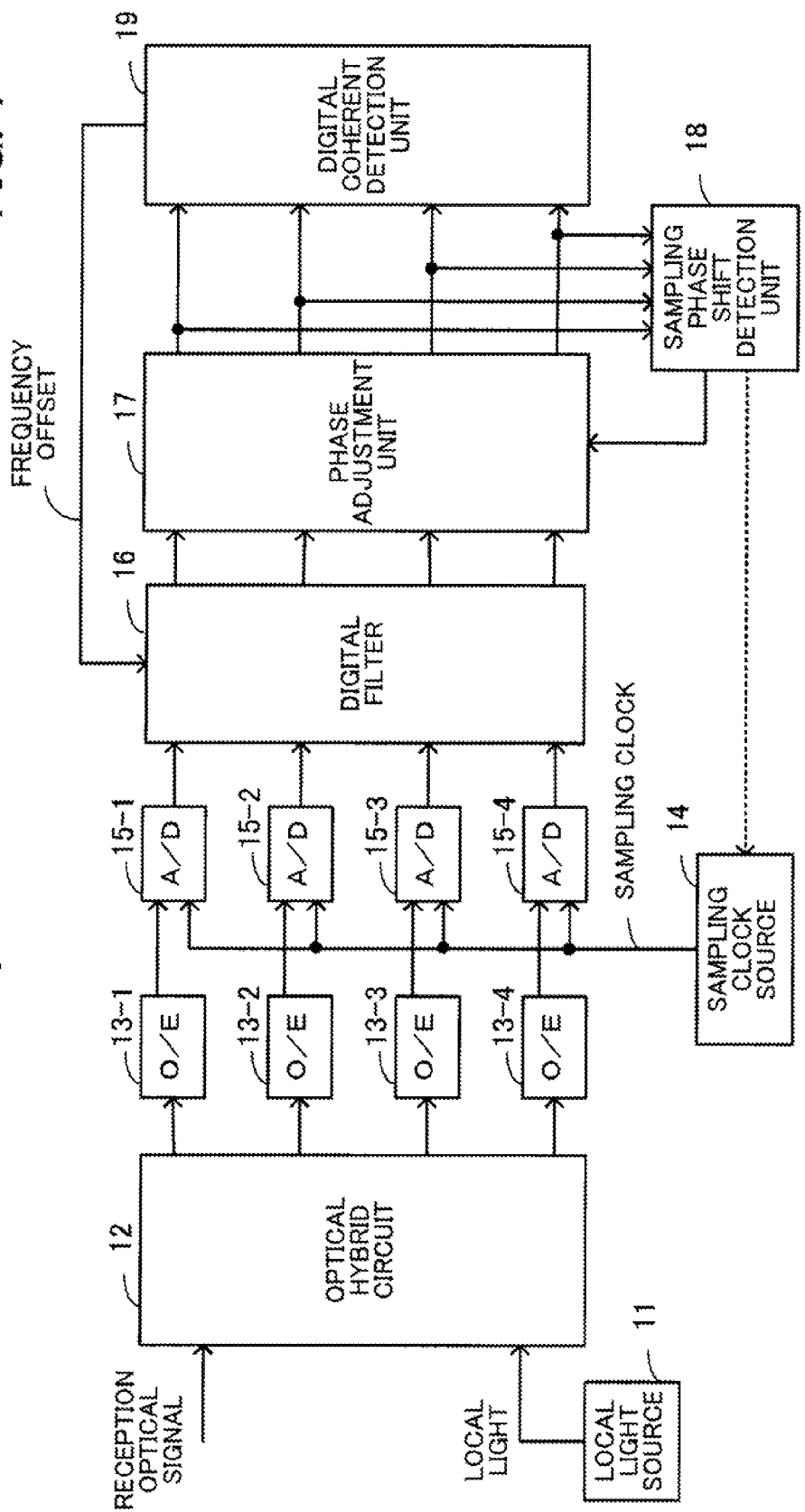
FIG. 7 illustrates a configuration example of a digital coherent receiving apparatus.

FIG. 7 illustrates a configuration example of the digital coherent receiving apparatus. The digital coherent receiving apparatus 10 includes a local light source 11, an optical hybrid circuit 12, O/E units 13-1 to 13-4, a sampling clock source 14, A/D converters 15-1 to 15-4, a digital filter 16, a phase adjustment unit 17, a sampling phase shift detection unit 18, and a digital coherent detection unit 19. For example, the digital filter 16, the phase adjustment unit 17, the sampling phase shift detection unit 18, and the digital coherent detection unit 19 may be comprised by a processor such as a digital signal processor (DSP).

A correspondence relationship between components of the sampling clock synchronizing apparatus 1 in FIG. 1 and the digital coherent receiving apparatus 10 is as follows. That is, the A/D converter 1a corresponds to the A/D converters 15-1 to 15-4, and the filter unit 1b corresponds to the digital filter 16. Further, a function of the sampling synchronization unit 1c corresponds to both of those of the phase adjustment unit 17 and the sampling phase shift detection unit 18. In addition, a method for adjusting a sampling phase may include a method for controlling a sampling clock frequency. For this purpose, a configuration having no phase adjustment unit or a configuration in combination of the phase adjustment circuit and the sampling clock frequency control may be used.

The local light source 11 independently outputs local light. The optical hybrid circuit 12 mixes the transmitted reception optical signal and the local light with each other, and supplies four electrical signals (details will be described later with reference to FIG. 8) corresponding to electric field information (a phase and intensity of light) of the reception optical signal (a configuration of the optical hybrid circuit 12 will be described later with reference to FIG. 8).

Each of the O/E units 13-1 to 13-4 converts the electric field information into an analog electrical signal. The sampling clock source 14 supplies a sampling clock for determining the sampling timing of the A/D converter. Each of the A/D converters 15-1 to 15-4 quantizes an analog signal including the electric field information by sampling timing of the received sampling clock, and converts it into a digital signal for output.

The digital filter 16 performs filter control for suppressing reduction in the detection sensitivity in a phase shift of a sampling clock with respect to a signal produced from the A/D converters 15-1 to 15-4 subjected to the spectral narrowing.

Specifically, the digital filter 16 has frequency characteristics for compensating a band limitation due to the spectral narrowing, and performs filter processing for compensating a frequency component whose band is limited based on a frequency offset (details will be described later).

In addition, the digital filter 16 may be installed on any of a pre-stage and post-stage of the phase adjustment unit 17. Further, the digital filter 16 may have a configuration in which it is shared with a filter which compensates wavelength distortion such as wavelength dispersion.

The phase adjustment unit 17 performs a phase adjustment of a sampling clock frequency to a modulation frequency based on the phase shift amount transmitted from the sampling phase shift detection unit 18, and synchronizes the sampling timing. The sampling phase shift detection unit 18 detects a phase shift between the modulation frequency of the reception optical signal and the sampling clock frequency, and supplies a result of the detected phase shift amount to the phase adjustment unit 17.

The digital coherent detection unit 19 detects a signal in which the sampling timing is synchronized, and demodulates received data for output. Further, the unit 19 monitors a shift (frequency offset) between a carrier frequency of the reception optical signal and a frequency of the local light, and feeds back the detected frequency offset to the digital filter 16.

An outline of the digital coherent detection will be here described. Think of a case (rotation is performed by a modulated phase in a phase modulation, and a phase fluctuation except for the rotation is not present at all) where a phase fluctuation is absent in the local light and also in the reception optical signal.

At this time, the carrier frequency of the reception optical signal is matched with the frequency of the local light. Then, in the optical hybrid circuit 12, the reception optical signal and the local light interfere with each other. When mutual phases are matched, the amplitude is equal to 1 by intensifying each other, whereas when mutual phases are shifted by n, the amplitude is equal to 0 by weakening each other. As a result, a baseband signal is produced from the optical hybrid circuit 12.

As can be seen from the above sequence, homodyne detection is a method in which a phase fluctuation is absent between the reception optical signal and the local light, and a detection is performed from a baseband signal generated by allowing the reception optical signal and local light whose frequencies are matched to interfere with each other.

When performing the homodyne detection in the coherent reception before digitalization, a phase fluctuation is detected and the detected phase fluctuation is fed back to a local light source to realize a matching between frequencies.

As compared with the coherent reception, in the detection using the digital coherent reception, a shift in a carrier frequency of the reception optical signal and a phase fluctuation between the reception optical signal and the local light are compensated by digital processing using the digital coherent detection unit 19.

Accordingly, since the digital coherent detection unit 19 synchronizes phases of the reception optical signal and the local light, and further frequencies of them, respectively, the local light source 11 may also output local light independently. Further, a waveform distortion such as wavelength dispersion and polarization mode dispersion may be compensated by the digital processing using the digital coherent detection unit 19.

Figure 8:
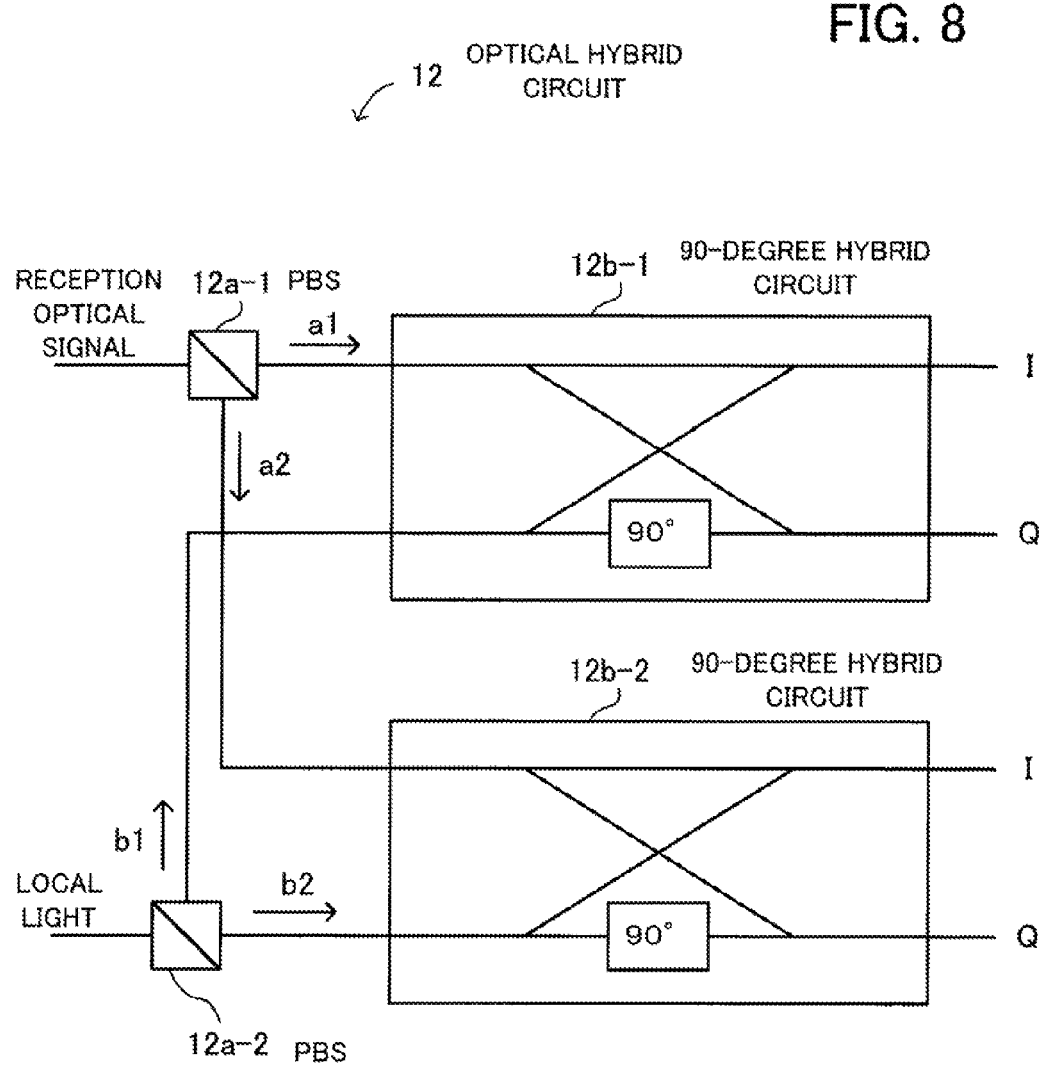
FIG. 8 illustrates a configuration example of an optical hybrid circuit.

Next, the optical hybrid circuit 12 will be described. FIG. 8 illustrates a configuration example of the optical hybrid circuit 12. The optical hybrid circuit 12 is a polarization diversity 90-degree hybrid circuit, and includes polarization beam splitters (PBS) 12a-1 and 12a-2, and 90-degree hybrid circuits 12b-1 and 12b-2.

The PBS 12a-1 branches into two light beams in a polarization state perpendicular to each other of the reception optical signal, and transmits one polarization beam a1 to the 90-degree hybrid circuit 12b-1 and the other polarization beam a2 to the 90-degree hybrid circuit 12b-2, respectively.

Further, the PBS 12a-2 branches into two light beams in a polarization state perpendicular to each other of the local light, and transmits one polarization beam b1 to the 90-degree hybrid circuit 12b-1 and the other polarization beam b2 to the 90-degree hybrid circuit 12b-2, respectively.

Polarized waves of the polarization beams a1 and b1 are matched, and polarized waves of the polarization beams a2 and b2 are matched.

The 90-degree hybrid circuit 12b-1 mixes the polarization beams a1 and b1, and outputs an in-phase (I) component in one polarization state. Further, the 90-degree hybrid circuit 12b-1 mixes the polarization beam a1 and a beam resulting from delaying a phase of the polarization beam b1 by 90 degrees, and outputs a quadrature phase (Q) component in the one polarization state.

The 90-degree hybrid circuit 12b-2 mixes the polarization beams a2 and b2, and outputs an I component in the other polarization state. Further, the 90-degree hybrid circuit 12b-2 mixes the polarization beam a2 and a beam resulting from delaying a phase of the polarization beam b2 by 90 degrees, and outputs a Q component in the other polarization state.

Examples of the optical hybrid circuit include a configuration in which an optical signal and local light are each supplied directly to two input terminals of the 90-degree hybrid circuit 12b-1 single body to be mixed, and I and Q components are output.

However, in this case, control for matching polarization states of the optical signal and the local light is necessary separately (when both of light beams whose polarized waves are matched are mixed, a beat is struck and therefore, I and Q components are output).

On the other hand, when a polarization diversity-type configuration as in the above-described optical hybrid circuit 12 is employed, the optical hybrid circuit is able to efficiently extract electric field information on a phase and intensity of the reception optical signal in each polarization state.

Next, the digital filter 16 will be described. Filter characteristics of the digital filter 16 have a shape as characteristics opposite to those of the spectral narrowing to which a transmitted optical signal is subjected.

In addition, the spectral narrowing mainly occurs at the time of passing through an optical filter in an optical repeater. However, it is not limited to passing through optical filter and is caused by various factors during the transmission. For example, also when an analog electrical band in transmitters and receivers is narrower than a band of transmission signals, the spectral narrowing occurs.

Accordingly, irrespective of the fact that the spectral narrowing occurs in which part, the digital filter 16 compensates as a target the spectral narrowing to which an optical signal is subjected up to an input stage of the digital filter 16.

Figure 9:
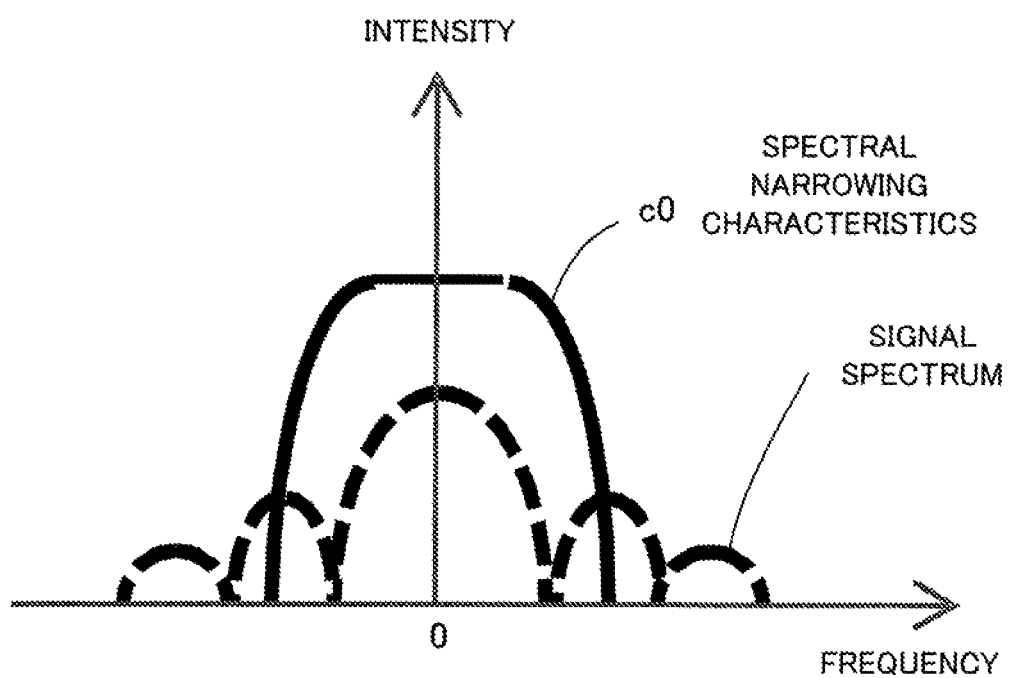
FIG. 9 illustrates characteristics of spectral narrowing.

FIG. 9 illustrates characteristics of the spectral narrowing. The horizontal axis represents the frequency, and the longitudinal axis represents the intensity, and FIG. 9 illustrates a case where a frequency offset is absent. Suppose, for example, that the spectral narrowing characteristics c0 are located in a position illustrated in the drawing with respect to a signal spectrum. An internal area of the spectral narrowing characteristics c0 is a passband.

When a signal whose band is limited by such spectral narrowing characteristics c0 is supplied without the compensation, the sampling phase shift detection unit 18 is not able to detect a sampling phase shift with high accuracy from the above-described reason.

Figure 10:
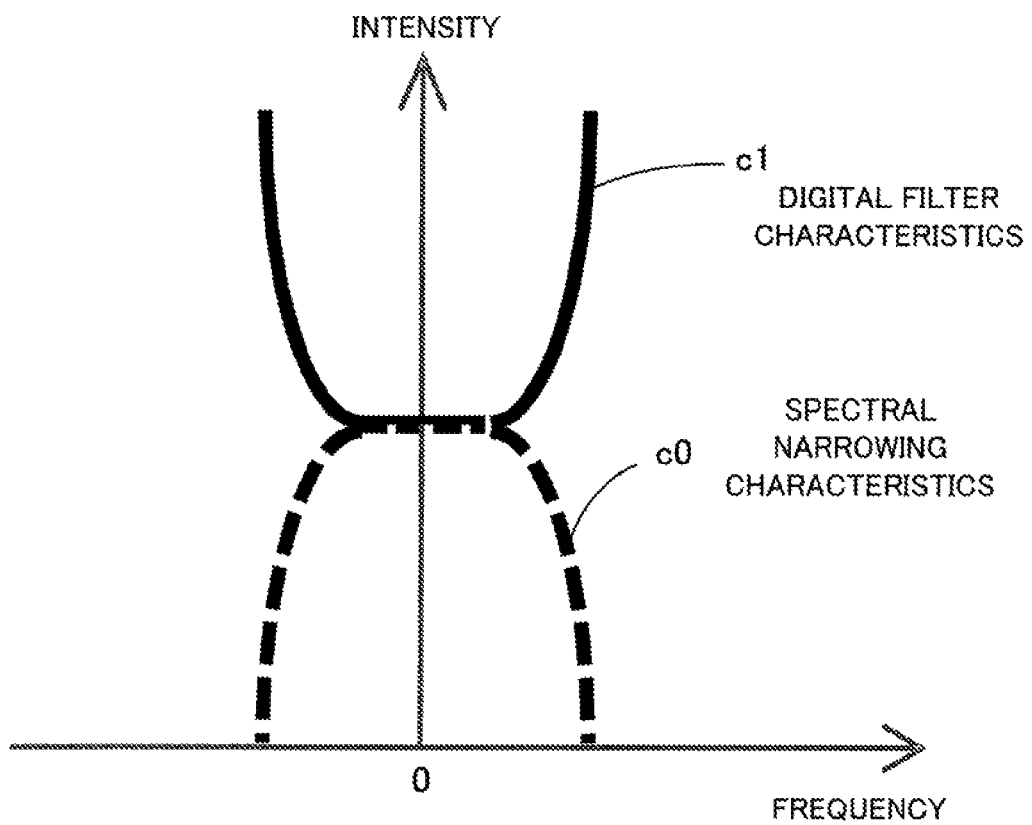
FIG. 10 illustrates characteristics of a digital filter.

FIG. 10 illustrates characteristics of the digital filter 16. The horizontal axis represents the frequency, and the longitudinal axis represents the intensity, and FIG. 10 illustrates a case where the frequency offset is absent. The digital filter characteristics c1 are those opposite to the spectral narrowing characteristics c0. An external side of a parabola illustrated in the digital filter characteristics c1 is a passband.

Figure 11:
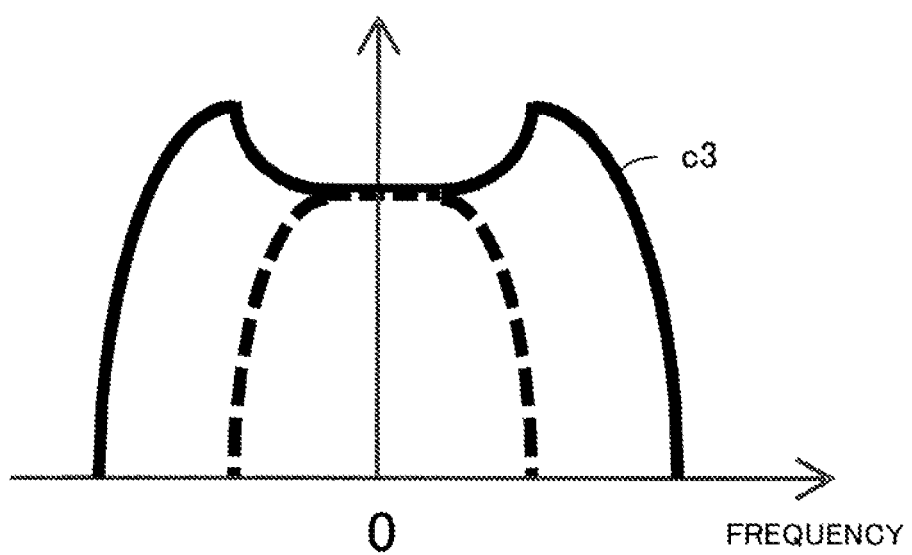
FIG. 11 illustrates an example of another shape of digital filter characteristics.

FIG. 11 illustrates an example of another shape of the digital filter characteristics. The horizontal axis represents the frequency, and the longitudinal axis represents the intensity, and FIG. 11 illustrates a case where the frequency offset is absent. As illustrated in FIG. 11, the digital filter characteristics c3 may have a configuration in which a band on the high frequency side except a signal band is cut off to a signal subjected to the spectral narrowing also in consideration of noise elimination performance.

When such characteristics are used, a band near an edge of the spectral narrowing characteristics c0 is compensated. Therefore, when a sampling phase shift is detected by using an optical signal after the compensation, jitter and wander tolerance is increased, a detection sensitivity in a phase shift of a sampling is elevated, and reception quality is improved.

Figure 12:
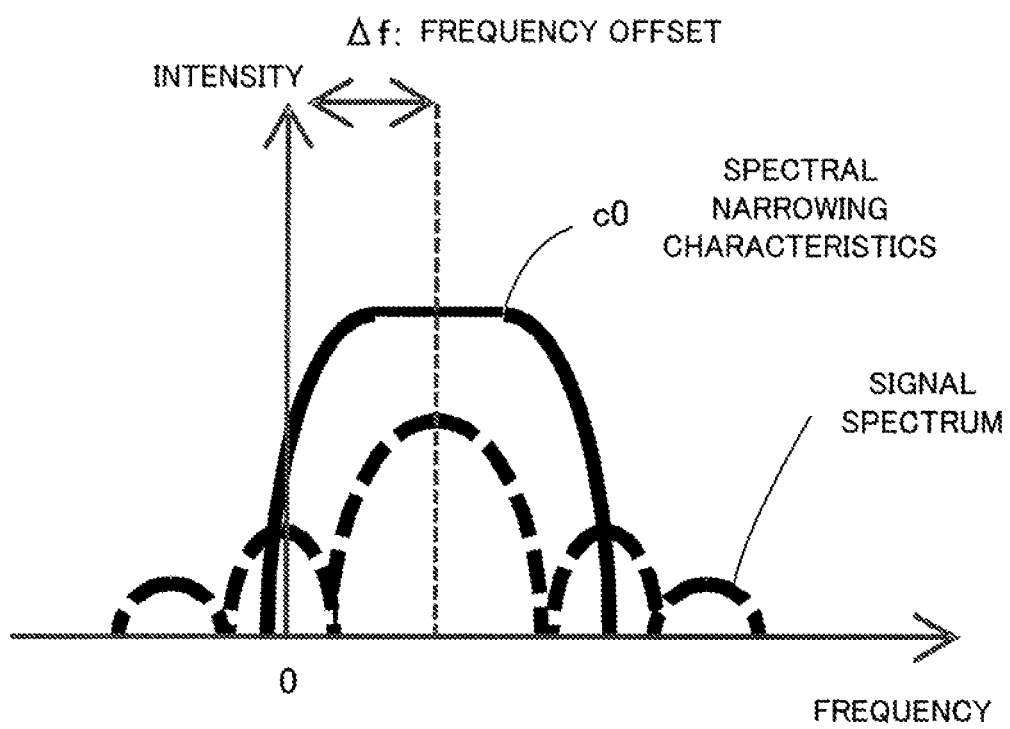
FIG. 12 illustrates characteristics of spectral narrowing.

FIG. 12 illustrates characteristics of the spectral narrowing. The horizontal axis represents the frequency, and the longitudinal axis represents the intensity, and FIG. 12 illustrates a case where the frequency offset is present. When the frequency offset $\Delta f$ is present, the signal spectrum and the spectral narrowing characteristics c0 are extracted as electric field information on an optical hybrid circuit output in the state where they are shifted from a center frequency to the high frequency side by $\Delta f$.

Figure 13:
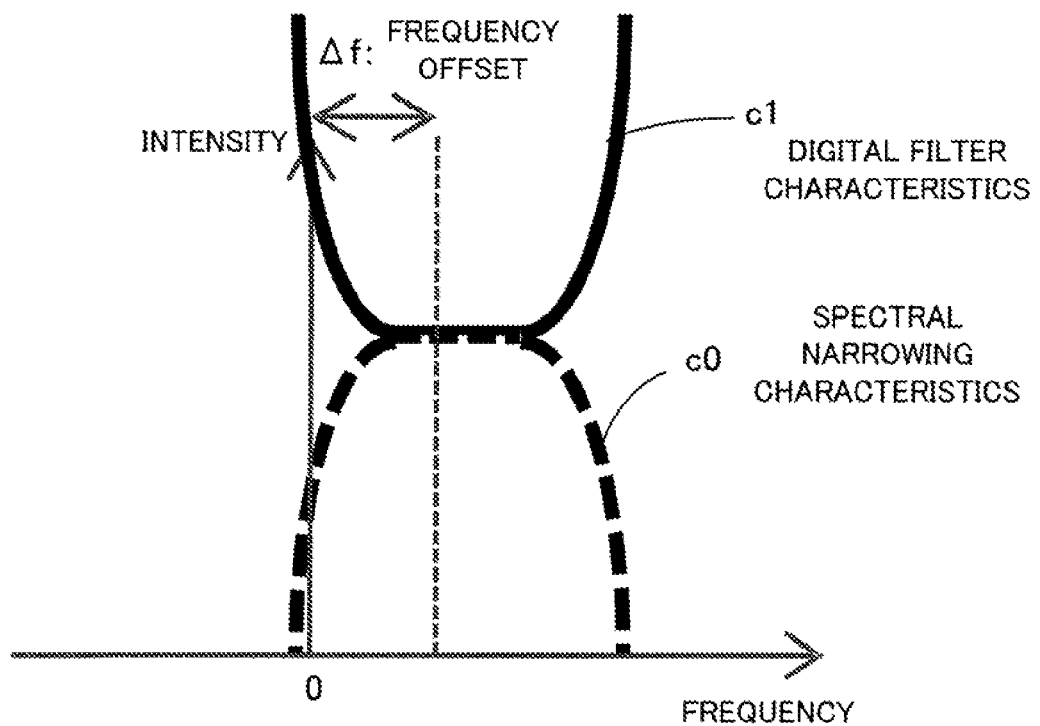
FIG. 13 illustrates characteristics of a digital filter.

FIG. 13 illustrates characteristics of the digital filter 16. The horizontal axis represents the frequency, and the longitudinal axis represents the intensity, and FIG. 13 illustrates a case where the frequency offset is present. The center frequency of the digital filter characteristics c1 is shifted to the high frequency side by the frequency offset $\Delta f$, and the digital filter characteristics c1 are opposite to the spectral narrowing characteristics.

As can be seen from the above sequence, when the frequency offset is present, the digital filter 16 adaptively shifts the center frequency of the digital filter characteristics c1 by the frequency offset detected by the digital coherent detection circuit. Further, the digital filter 16 varies a frequency component to be compensated by itself according to the frequency offset amount. This permits the digital filter 16 to appropriately compensate a band cutoff due to the spectral narrowing according to the frequency offset amount. In addition, a method for feeding back the frequency offset amount to the local light source and compensating the frequency offset itself is also used.

Figure 14:
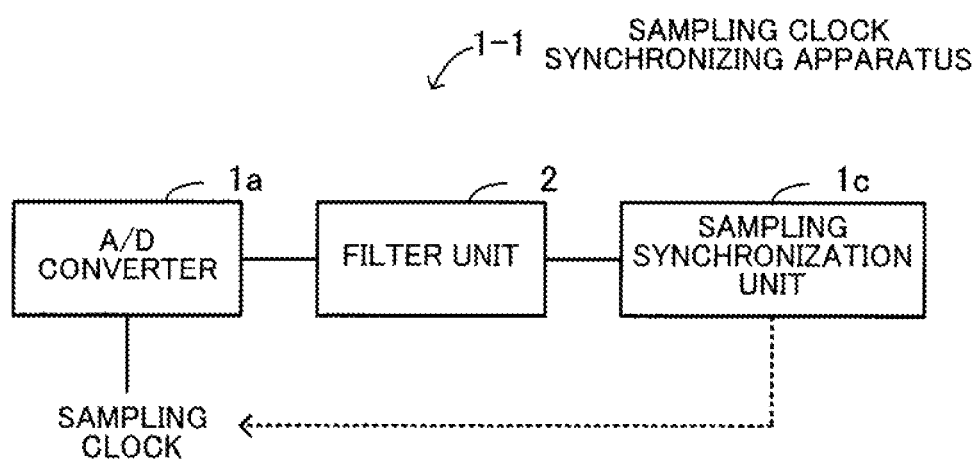
FIG. 14 illustrates a configuration example of a sampling clock synchronizing apparatus.

Next, another embodiment will be described. FIG. 14 illustrates a configuration example of a sampling clock synchronizing apparatus. The sampling clock synchronizing apparatus 1-1 includes the A/D converter 1a, a filter unit 2, and the sampling synchronization unit 1c. In addition, a method for adjusting a sampling phase may include a method for controlling a sampling clock frequency. Therefore, a configuration having no phase adjustment unit 17 or a configuration in combination of a phase adjustment circuit and sampling clock frequency control may be used. Operations of the A/D converter 1a and the sampling synchronization unit 1c are performed in the same manner as in FIG. 1.

The filter unit 2 has filter characteristics for extracting a predetermined band from among a passband of the spectral narrowing with respect to a signal produced from the A/D converter 1a subjected to the spectral narrowing. Specifically, the filter unit 2 performs a filtering operation for extracting a predetermined band necessary for detecting a phase shift of a sampling clock by the sampling synchronization unit 1c.

Next, a configuration and operations of the digital coherent receiving apparatus will be described in detail as an optical reception apparatus to which the sampling clock synchronizing apparatus 1-1 is applied.

Figure 15:
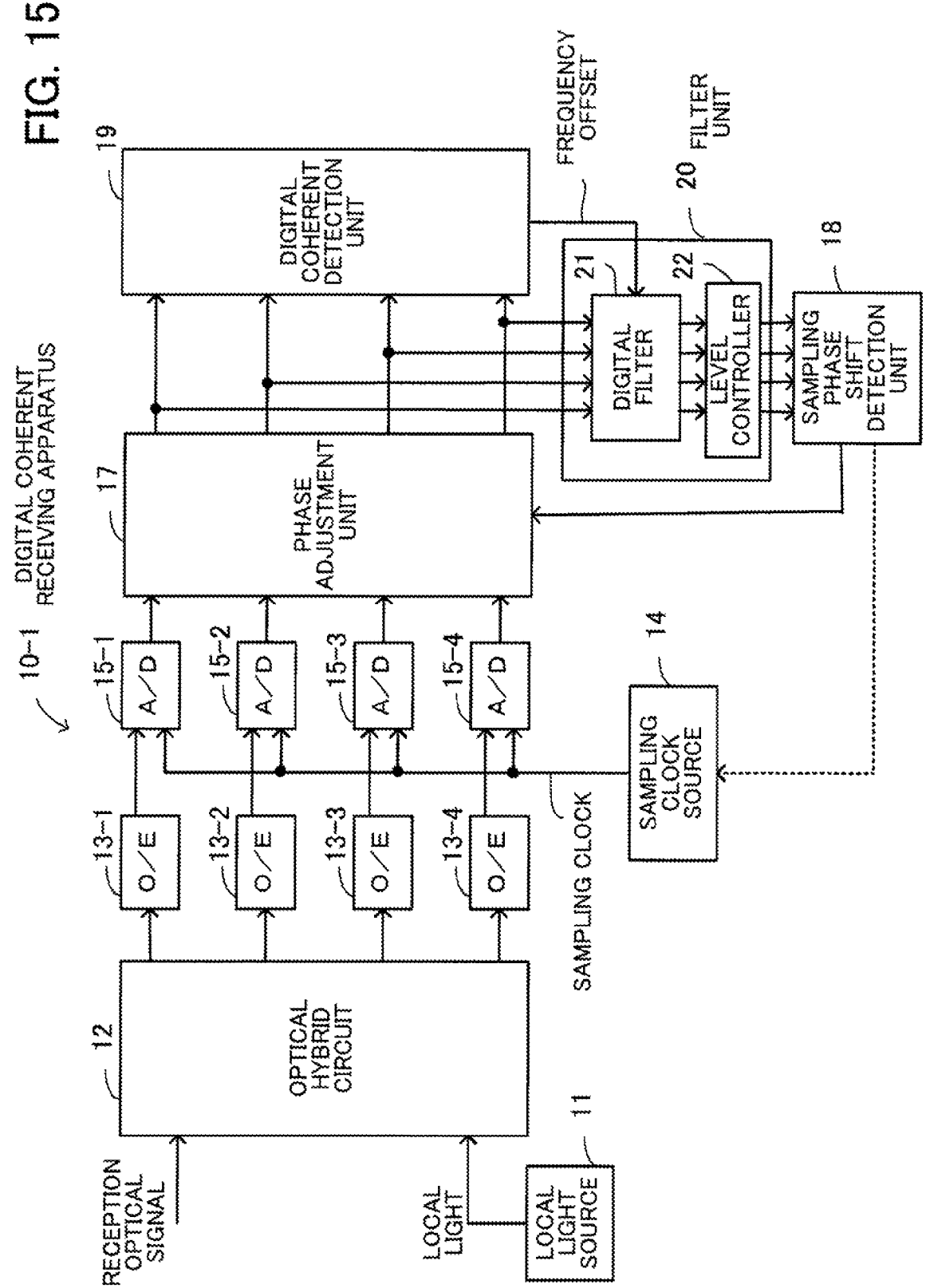
FIG. 15 illustrates a configuration example of a digital coherent receiving apparatus.

FIG. 15 illustrates a configuration example of the digital coherent receiving apparatus. The illustrated digital coherent receiving apparatus 10-1 includes the local light source 11, the optical hybrid circuit 12, the O/E units 13-1 to 13-4, the sampling clock source 14, the A/D converters 15-1 to 15-4, the phase adjustment unit 17, the sampling phase shift detection unit 18, the digital coherent detection unit 19, and a filter unit 20. For example, the phase adjustment unit 17, the sampling phase shift detection unit 18, the digital coherent detection unit 19, and the filter unit 20 may be comprised by a processor such as a digital signal processor (DSP).

The digital coherent receiving apparatus 10-1 differs from the apparatus illustrated in FIG. 7 in the following points. That is, in the digital coherent receiving apparatus 10-1, the digital filter is absent between the A/D converters 15-1 to 15-4 and the phase adjustment unit 17. Further, the filter unit 20 is installed between the phase adjustment unit 17 and the digital coherent detection unit 19. Since every configuration except the above-described configurations is the same as each other, the filter unit 20 will be described.

The filter unit 20 has a digital filter 21 and a level controller 22. The filter unit 20 performs filter control for suppressing reduction in detection sensitivity in a phase shift of a sampling clock with respect to a signal produced from the A/D converters 15-1 to 15-4 subjected to the spectral narrowing.

The digital filter 21 has filter characteristics for passing a predetermined band necessary for detecting a phase shift in the sampling phase shift detection unit 18 of a post-stage in a passband of the spectral narrowing.

The level controller 22 amplifies a level produced from the digital filter 21 so as to become a fixed level. In FIG. 15, for example, the level controller 22 performs amplification control so that a sum of squares of each level in four output signals becomes a fixed level with respect to four output signals produced from the digital filter 21. The level controller 22 is not a necessary component, and therefore the digital filter 21 may have a fixed gain. For example, the installation of the level controller 22 makes it possible to compensate a sensitivity fluctuation in a sampling phase shift due to variation in a spectral narrowing rate in the case of receiving an optical signal in which the number of repeaters through which it passes is different.

Figure 16:
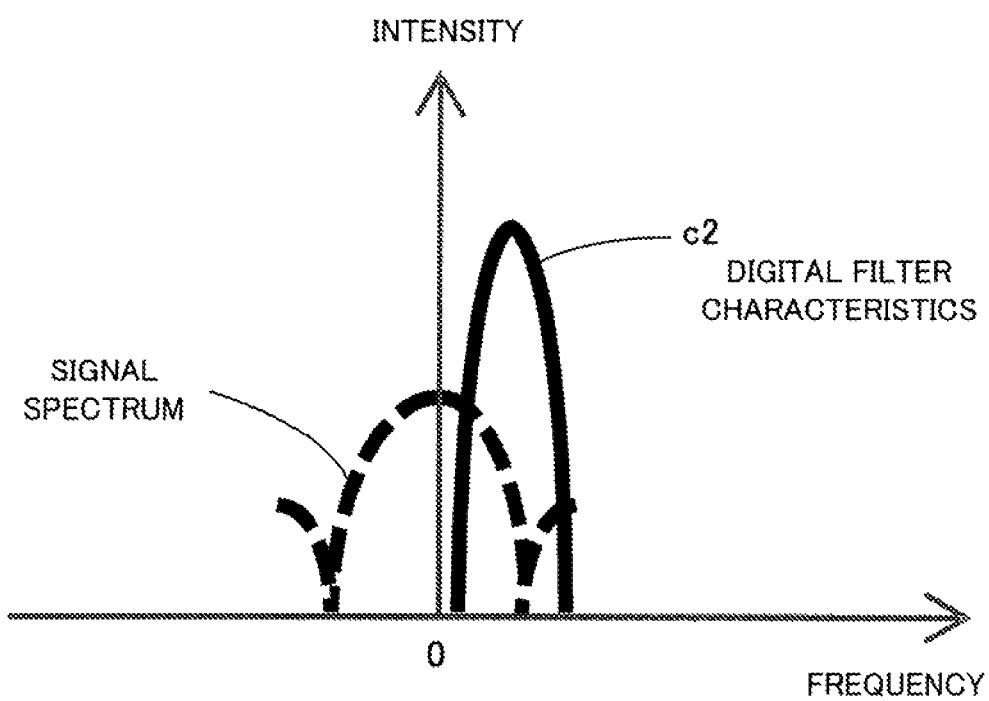
FIG. 16 illustrates characteristics of a digital filter.

Next, the digital filter 21 will be described. FIG. 16 illustrates characteristics of the digital filter 21. The horizontal axis represents the frequency, and the longitudinal axis represents the intensity, and FIG. 16 illustrates a case where the frequency offset is absent. In addition, a state of the spectral narrowing characteristics c0 is derived in the same manner as in FIG. 9.

The digital filter characteristics c2 have characteristics for passing only a predetermined band necessary for detecting a phase shift by the sampling phase shift detection unit 18 of a post-stage with respect to a passband of the spectral narrowing characteristics c0. For example, when the sampling phase shift detection unit detects a phase shift mainly by a high frequency component of signals, most of direct current components of signals become noise and it causes reduction in sensitivity.

Accordingly, the digital filter characteristics c2 are, specifically, bandpass filter characteristics for extracting a high frequency band from among a passband through the spectral narrowing (an internal area of the digital filter characteristics c2 is a passband). By using the above-described filter characteristics, the sampling phase shift detection unit 18 extracts a high frequency band from among a passband through the spectral narrowing, and detects a sampling phase shift from signals including the extracted high frequency components.

As a result, when the sensitivity of the sampling phase shift detection unit 18 is raised, jitter and wander tolerance is increased and the reception quality is improved.

Figure 17:
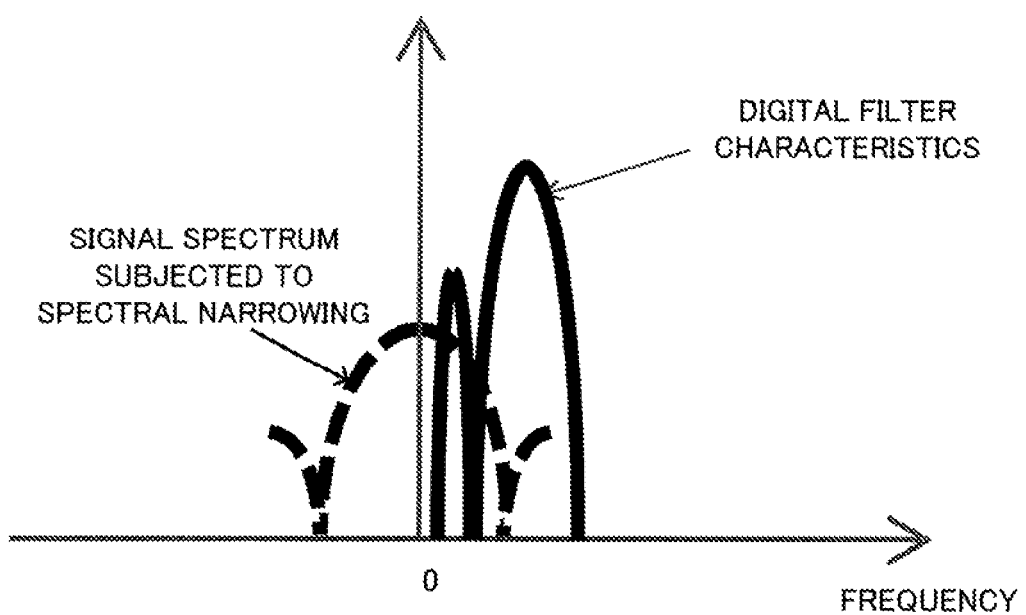
FIG. 17 illustrates an example of yet another shape of digital filter characteristics.
Figure 18:
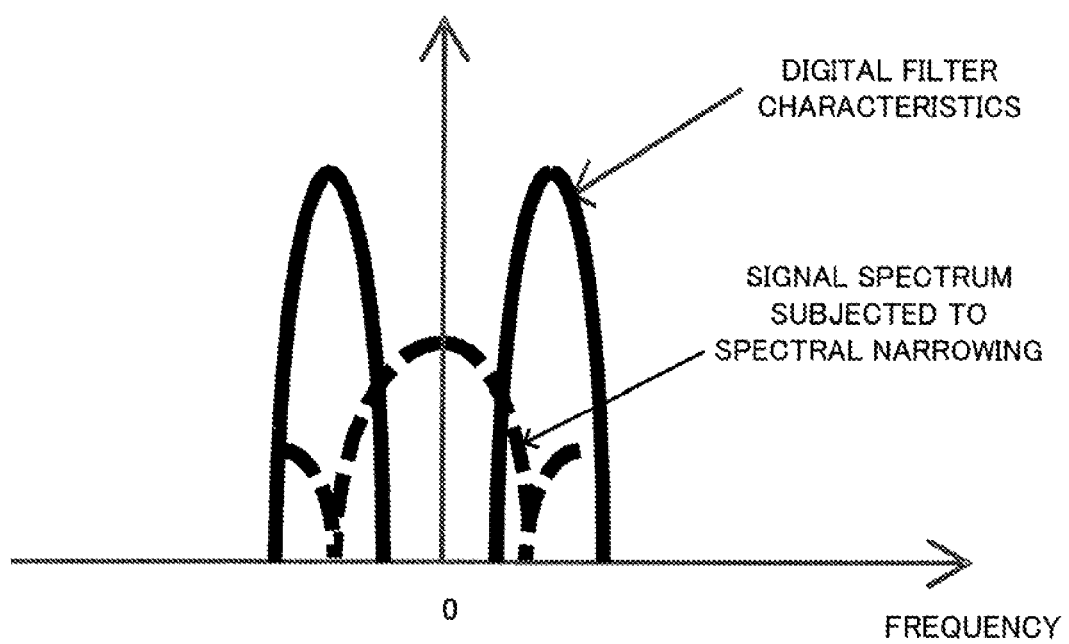
FIG. 18 illustrates an example of yet another shape of digital filter characteristics.

FIGS. 17 and 18 illustrate other shape examples of the digital filter characteristics. The horizontal axis represents the frequency, and the longitudinal axis represents the intensity, and FIGS. 17 and 18 illustrate a case where the frequency offset is absent. In the above, bandpass filter characteristics are used and further, for example, a high frequency component may be extracted by using highpass filter characteristics. Or, there may be used a shape which allows a main signal component to pass through as illustrated in FIG. 10 depending on a sampling phase shift detection method. In addition, as illustrated in FIGS. 17 and 18, a shape having two passbands may be used.

Figure 19:
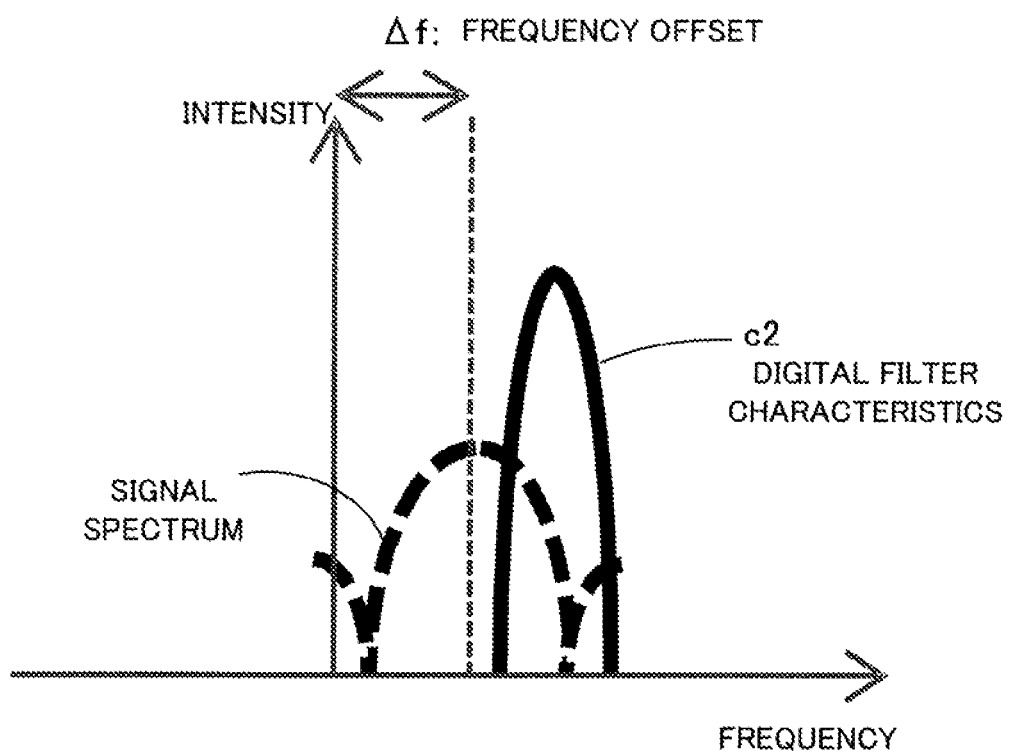
FIG. 19 illustrates characteristics of a digital filter.

FIG. 19 illustrates characteristics of the digital filter 21. The horizontal axis represents the frequency, and the longitudinal axis represents the intensity, and FIG. 19 illustrates a case where the frequency offset is present. A state of the spectral narrowing characteristics c0 at the time when the frequency offset is present is derived in the same manner as in FIG. 12.

When a reception signal component is shifted due to the frequency offset to the high frequency side by $\Delta f$, a center frequency of the digital filter characteristics c2 for extracting a high frequency band is shifted to the high frequency side by $\Delta f$ of the frequency offset from a center frequency of the digital filter characteristics c2 at the time when the frequency offset is absent.

As can be seen from the above sequence, when the frequency offset is present, the center frequency of the digital filter characteristics c2 is adaptively shifted by the frequency offset detected by using the digital coherent detection unit. Further, a frequency component to be compensated by the digital filter 21 is varied according to the frequency offset amount.

As a result, a predetermined band necessary for detecting a sampling phase shift is able to be appropriately extracted according to the frequency offset amount. In addition, a method for feeding back the frequency offset amount to a local light source and compensating a frequency offset itself may also be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions and alterations could be made hereto without departing from the spirit and scope of the invention.

What is claimed is:

1. A digital coherent receiving apparatus comprising:
    an optical hybrid circuit which mixes a reception optical signal with local oscillation light and outputs electric field information of the reception optical signal;
    an optical/electrical converter which converts the electric field information into an electrical analog signal;
    an A/D converter which converts the electrical analog signal into a digital signal based on a sampling clock; and
    a processor which detects a phase shift in the sampling clock and synchronizes sampling timing, performs filter control for suppressing reduction in detection sensitivity of phase shift in the sampling clock with respect to the digital signal produced from the A/D converter subjected to spectral narrowing, and performs reception data detection.

2. The digital coherent receiving apparatus according to claim 1,
    wherein the processor performs the filter control for compensating a band limitation due to the spectral narrowing with respect to an output signal from the A/D converter by using filter characteristics of characteristics opposite to those of the spectral narrowing.

3. The digital coherent receiving apparatus according to claim 2,
    wherein the processor detects a frequency offset between a carrier frequency of the reception optical signal and a frequency of the local oscillation light, and adaptively shifts a center frequency of the filter characteristics according to the frequency offset amount.

4. The digital coherent receiving apparatus according to claim 1,
    wherein the processor performs the filter control by using filter characteristics for passing through only a predetermined band with respect to an output signal from the A/D converter.

5. The digital coherent receiving apparatus according to claim 4,
    wherein the processor detects a frequency offset between a carrier frequency of the reception optical signal and a frequency of the local oscillation light, and adaptively shifts a center frequency of the filter characteristics according to the frequency offset amount.

* * * * *